United States Patent [19]
Files et al.

[11] Patent Number: 5,657,054
[45] Date of Patent: Aug. 12, 1997

[54] DETERMINATION OF PEN LOCATION ON DISPLAY APPARATUS USING PIEZOELECTRIC POINT ELEMENTS

[75] Inventors: Leigh Ann Files, Dallas; Charles E. Primm, Plano; Robert H. Taylor, Richatrdson, all of Tex.

[73] Assignee: Texas Instruments Incorporated, Dallas, Tex.

[21] Appl. No.: 429,369

[22] Filed: Apr. 26, 1995

[51] Int. Cl.$^6$ .................................................... G09G 5/00
[52] U.S. Cl. ........................ 345/177; 345/173; 345/179; 178/18
[58] Field of Search ..................... 345/177, 179, 345/173; 364/709.11; 178/18; 367/907

[56] References Cited

U.S. PATENT DOCUMENTS

| | | | |
|---|---|---|---|
| 3,755,704 | 8/1973 | Spindt et al. | 313/309 |
| 4,078,226 | 3/1978 | EerNisse et al. | 178/18 |
| 4,246,439 | 1/1981 | Romein | 178/18 |
| 4,665,282 | 5/1987 | Sato et al. | 345/179 |
| 4,777,329 | 10/1988 | Mallicoat | 345/177 |
| 4,814,552 | 3/1989 | Stebik et al. | 345/177 |
| 4,845,684 | 7/1989 | Garwin et al. | 345/179 |
| 4,857,799 | 8/1989 | Spindt et al. | 313/495 |
| 4,940,916 | 7/1990 | Borel et al. | 313/306 |
| 5,017,915 | 5/1991 | Kaneko et al. | 345/177 |
| 5,097,415 | 3/1992 | Yoshimura et al. | 345/177 |
| 5,194,780 | 3/1993 | Meyer et al. | 315/169.3 |
| 5,225,820 | 7/1993 | Clerc et al. | . |
| 5,308,936 | 5/1994 | Biggs et al. | 178/18 |
| 5,402,151 | 3/1995 | Dunaer | 345/177 |
| 5,500,492 | 3/1996 | Kobayashi et al. | 345/177 |

OTHER PUBLICATIONS

Pen Expo "93, Boston, MA, Masahiko Yamada, "Optimum Pen Design and Phase Switch Technology for High Speed Data Capture," pp. 1–6, Aug. 30, 1993–Sep. 03, 1993.

Primary Examiner—Richard Hjerpe
Assistant Examiner—Kent Chang
Attorney, Agent, or Firm—Rose Alyssa Keagy; Richard L. Donaldson

[57] ABSTRACT

A stylus location system comprises a field emission device having an anode plate 32 and an emitter plate 2, and a plurality of piezoelectric point elements 34, 42 coupled to the anode plate. The piezoelectric point elements 34, 42 are capable of transforming electrical energy into ultrasonic energy and transforming ultrasonic energy into electrical energy. A stylus 30 is also coupled to the anode plate 32 and circuitry 36, 46, 48 is coupled to the piezoelectric point elements 42 for determining the position of the stylus 30. The circuitry 36 may also send a video data signal to the emitter plate 2 in response to the position determination.

19 Claims, 5 Drawing Sheets

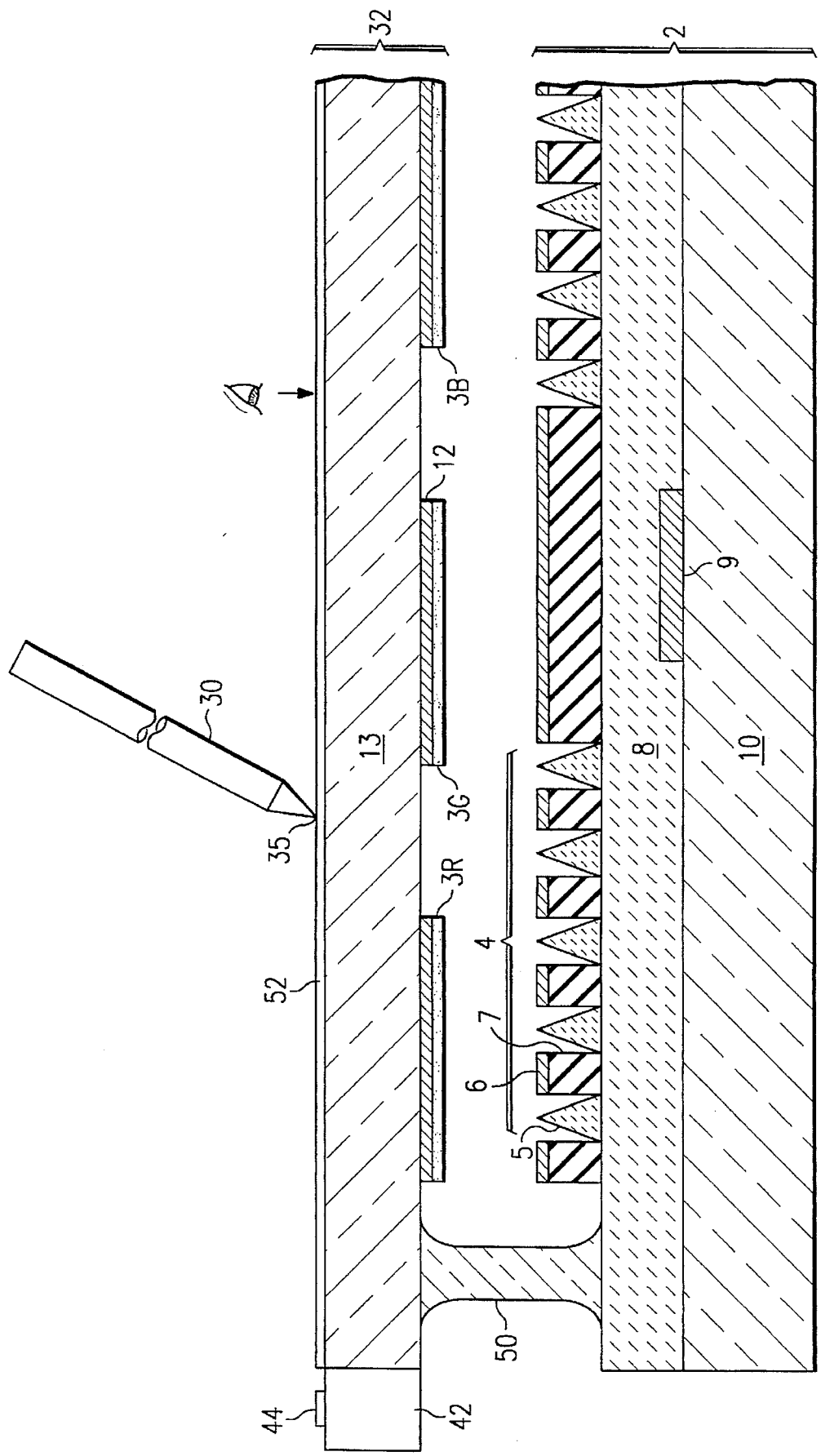

DETERMINATION OF PEN LOCATION ON DISPLAY APPARATUS USING PIEZOELECTRIC POINT ELEMENTS

RELATED APPLICATION

This application includes subject matter which is related to U.S. patent application Ser. No. 08/429,373, "Integration of Pen-based Capability Into a Field Emission Device System Using Piezoelectric Stripes," (Texas Instruments, Inc., Docket No. 19912), filed Apr. 26, 1995. In addition, this application includes subject matter which is related to U.S. patent application Ser. No. 08/429,371, "Method For Integrating Pen-Based Capability Into a Field Emission Device System Using Piezoelectric Stripes," (Texas Instruments, Inc. Docket No. TI-20549), filed Apr. 26, 1995. Furthermore, this application includes subject matter which is related to U.S. patent application Ser. No. 08/429,368, "Method For Determining Pen Location on Display Apparatus Using Piezoelectric Elements," (Texas Instruments, Inc. Docket No. TI-20550), filed Apr. 26, 1995.

TECHNICAL FIELD OF THE INVENTION

The present invention relates generally to an apparatus for determining the location of a stylus or pen on a display using piezoelectric technology and, more particularly, to the integration of pen location computing capability using piezoelectric technology in a field emission device ("FED") display system.

BACKGROUND OF THE INVENTION

Pen-based computer systems are electrograph computer systems which use an electronic pen or stylus, instead of, or in addition to, a keyboard, to enter data and to control various computer functions, by writing, sketching, and pointing, directly on the computer display. The computer systems which utilize pen-based technology may be portable, e.g. battery-operated and less than six pounds; they may be desktop, e.g. AC-powered and transportable but not designed to operate while being moved; and they may be terminal-based, e.g. used as a terminal in communicating with a mainframe computer on a network or via a modem or LAN (Local Area Network).

The portable market segment is targeting forms entry applications for inventory, insurance, delivery vehicles, field service, nursing/health care, law enforcement, and industries where workers are accustomed to filing in forms on a clipboard. Desktop systems are targeted at executives, stock brokers, business, and office automation. The terminal based market includes factory automation, industrial control, and point-of-sale.

There are basically four pen-input technologies used in pen-based computers: 1) a direct contact, resistive technology with indium-tin oxide deposited on the top surface of the outside glass support, 2) a wire grid construction implemented in indium-tin oxide coating which is located on a multi-layer glass assembly placed on top of the glass, 3) a conventional wire-grid electromagnetic digitizer placed underneath the outside display glass, and 4) a position responsive surface or digitizer having writing surfaces formed of a continuous resistive material located on a supportive substrate such as glass or plastic placed on top of the display. The stylus used in these systems may be corded or cordless; and active or passive.

The first technology, direct-contact resistive, is an adaptation of an older touch screen technology and requires that the indium-tin oxide coating be placed on the top surface of the FED anode glass support 13 so that the stylus can directly contact the electrically active layer, a so-called "direct-contact" technology. It is well known that this method of construction is subject to scratches and wear during normal operation and will not meet the durability requirements of the computer products industry.

The second technology, while having good performance and durability, is considerably more complex and costly to implement. This is because the wire grid structure requires a minimum of two sheets of coated glass, the etching of high-tolerance "wires" in the indium-tin oxide coating, and a complex system of custom driver circuits attached to each row and column of the sensor grid.

The third technology, wire-grid electromagnetic, has implementation problems associated with the fact that the digitizer is located approximately one-half inch below the writing surface. Tooling costs are generally higher than that of other technologies. Each wire in the sensor grid (typically between 50 and 200 individual wires, or more for higher resolution systems) must be connected to an electronic controller circuit. Electromagnetic digitizers also typically require a plane of magnetic material behind the wire-grid sensor to shield the system from stray magnetic effects. The additional weight of the wire-grid digitizer underneath the display adds burdensome weight to the unit.

The fourth technology, resistive layer type electrographic digitizers, also has many disadvantages. First, there are problems with erroneous position readings caused by stray capacitance. Since computer screens are rectangular and not square, the edge-to-edge resistances in the horizontal direction is not the same as in the vertical direction; therefore, the resolution of the system is not the same in both directions. Furthermore, resistive layer electrographic digitizers are sensitive to electrical interference from externally generated noise and hand effects.

FIG. 1 shows an example of how current pen-based technology is implemented in display systems using the resistive layer type of an electrographic digitizer. The digitizer consists of a single substrate of soda-lime float glass 17 coated on the underneath surface with a single layer of indium-tin-oxide (ITO) 15. Plastic is sometimes laminated to the glass panel 17 for added strength. Digitizer circuitry 14 is connected to the face of the display. Electrical connection to the ITO is made by a silver wiring pattern on the periphery of the glass. The controller 16 signals the digitizer circuitry 14 to generate a 100 KHz AC drive voltage. Analog switches distribute drive signals to the four corners of the resistive ITO layer, creating an AC voltage gradient which alternates between the x and y axis. The tip of stylus 20, located on the glass surface opposite the ITO, detects the local magnitude of the applied voltage gradient by AC capacitive coupling. Analog circuits (not shown) amplify and filter the AC position signals and convert them to digital coordinate data. The controller then sends the appropriate display data to the display driver 18 of the flat panel display 22.

All four of the pen-input technologies described above have resolution granularity problems, the detection grid and the video display more often than not do not map precisely to the same x,y location. For this reason, the pen-input data that the digitizer reports must be calibrated to approximate the location of the video pixels viewed by the user. This calibration often makes correct recognition more difficult than it would be if the digitizer and the video display coordinates were precisely the same.

Another problem with all four of the pen-input technologies described above is that numerous components must be added to the pen-based systems. Components such as a controller, converters, numerous switching circuits, and other supportive devices must be added to the system electronics. These additional components increase the complexity of the system, decrease system reliability, and increase system cost.

Advances in field emission display technology are disclosed in U.S. Pat. No. 3,755,704, "Field Emission Cathode Structures and Devices Utilizing Such Structures," issued 28 Aug. 1973, to C. A. Spindt et al.; U.S. Pat. No. 4,940,916, "Electron Source with Micropoint Emissive Cathodes and Display Means by Cathodoluminescence Excited by Field Emission Using Said Source," issued 10 Jul. 1990 to Michel Borel et al.; U.S. Pat. No. 5,194,780, "Electron Source with Microtip Emissive Cathodes," issued 16 Mar. 1993 to Robert Meyer; and U.S. Pat. No. 5,225,820, "Microtip Trichromatic Fluorescent Screen," issued 6 Jul. 1993, to Jean-Frédéric Clerc. These patents are incorporated by reference into the present application.

A FED flat panel display arrangement is disclosed in U.S. Pat. No. 4,857,799, "Matrix-Addressed Flat Panel Display," issued Aug. 15, 1989, to Charles A. Spindt et al., incorporated herein by reference. This arrangement includes a matrix array of individually addressable light generating means of the cathodoluminescent type having electron emitting cathodes combined with an anode which is a luminescing means of the CRT type which reacts to electron bombardment by emitting visible light. Each cathode is itself an array of thin film field emission cathodes on a backing plate, and the luminescing means is provided as a phosphor coating on a transparent face plate which is closely spaced to the cathodes.

The emitter backing plate disclosed in the Spindt et al. ('799) patent includes a large number of vertical conductive cathode electrodes which are mutually parallel and extend across the backing plate and are individually addressable. Each backing plate includes a multiplicity of spaced-apart electron emitting tips which project upwardly from the vertical cathode electrodes on the backing plate and therefore extend perpendicularly away from the backing plate. An electrically conductive gate electrode arrangement is positioned adjacent to the tips to generate and control the electron emission. The gate electrode arrangement comprises a large number of individually addressable, horizontal electrode stripes which are mutually parallel and extend along the backing plate orthogonal to the cathode electrodes, and which include apertures through which emitted electrons may pass. Each gate electrode is common to a full row of pixels extending across the front face of the backing plate and is electrically isolated from the arrangement of cathode electrodes. The emitter back plate and the anode face plate are parallel and spaced apart.

The anode is a thin film of an electrically conductive transparent material, such as indium tin oxide, which covers the interior surface of the face plate. Deposited onto this metal layer is a luminescent material, such as phosphor, that emits light when bombarded by electrons.

The array of emitting tips are activated by addressing the orthogonally related cathode gate electrodes in a generally conventional matrix-addressing scheme. The appropriate cathode electrodes of the display along a selected stripe, such as along one column, are energized while the remaining cathode electrodes are not energized. Gate electrodes of a selected stripe orthogonal to the selected cathode electrode are also energized while the remaining gate electrodes are not energized, with the result that the emitting tips of a pixel at the intersection of the selected cathode and gate electrodes will be simultaneously energized, emitting electrons so as to provide the desired pixel display.

The Spindt et al. patent teaches that it is preferable that an entire row of pixels be simultaneously energized, rather than energization of individual pixels. According to this scheme, sequential lines are energized to provide a display frame, as opposed to sequential energization of individual pixels in a raster scan manner.

The Clerc ('820) patent discloses a trichromatic field emission flat panel display having a first substrate comprising the cathode and gate electrodes, and having a second substrate facing the first, including regularly spaced, parallel conductive stripes comprising the anode electrode. These stripes are alternately covered by a first material luminescing in the red, a second material luminescing in the green, and a third material luminescing in the blue, the conductive stripes covered by the same luminescent material being electrically interconnected.

Today, a conventional FED is manufactured by combining the teachings of many practitioners, including the teachings of the Spindt et al. ('799) and Clerc ('820) patents. Referring now to the prior art device of FIG. 2, there is shown, in cross-sectional view, a portion of an illustrative field emission device in which the present invention may be incorporated. In this embodiment, the field emission device comprises an anode plate 1 having an single electroluminescent phosphor coating for monochrome displays or three different electroluminescent phosphor coatings, such a $3_R$, $3_G$, and $3_B$ for color displays, facing an emitter plate 2, the phosphor coatings $3_R$, $3_G$, and $3_B$ being observed from the side opposite to its excitation.

More specifically, the field emission device of FIG. 2 comprises a cathodoluminescent anode plate 1 and an electron emitter (or cathode) plate 2. A cathode portion of emitter plate 2 includes conductors 9 formed on an insulating substrate 10, an electrically resistive layer 8 which is formed on substrate 10 and overlaying the conductors 9, and a multiplicity of electrically conductive microtips 5 formed on the resistive layer 8. In this example, the conductors 9 comprise a mesh structure, and microtip emitters 5 are configured as a matrix within the mesh spacings. Microtips 5 take the shape of cones which are formed within apertures through conductive layer 6 and insulating layer 7.

A gate electrode comprises the layer of the electrically conductive material 6 which is deposited on the insulating layer 7. The thicknesses of gate electrode layer 6 and insulating layer 7 are chosen in such a way that the apex of each microtip 5 is substantially level with the electrically conductive gate electrode layer 6. Conductive layer 6 may be in the form of a continuous layer across the surface of substrate 10; alternatively, it may comprise conductive bands across the surface of substrate 10.

Anode plate 1 comprises a transparent, electrically conductive film 12 deposited on a transparent planar support 13, such as glass, which is positioned facing gate electrode 6 and parallel thereto, the conductive film 12 being deposited on the surface of the glass support 13 directly facing gate electrode 6. Conductive film 12 may be in the form of a continuous layer across the surface of the glass support 13; alternatively, it may be in the form of electrically isolated stripes comprising three series of parallel conductive bands across the surface of the glass support 13, as shown in FIG. 2 and as taught in U.S. Pat. No. 5,225,820, to Clerc. By way of example, a suitable material for use as conductive film 12 may be indium-tin-oxide (ITO), which is optically transparent and electrically conductive. Anode plate 1 also comprises a cathodoluminescent phosphor coating 3, deposited over conductive film 12 so as to be directly facing and immediately adjacent gate electrode 6. In the Clerc patent, the conductive bands of each series are covered with a particulate phosphor coating which luminesces in one of the three primary colors, red, blue and green $3_R$, $3_B$, $3_G$.

Selected groupings of microtip emitters 5 of the above-described structure are energized by applying a negative potential to cathode electrode 9 relative to the gate electrode 6, via voltage supply 19, thereby inducing an electric field which draws electrons from the apexes of microtips 5. The potential between cathode electrode 9 and gate electrode 6 is approximately 70–100 volts. The freed electrons are accelerated toward the anode plate 1 which is positively biased by the application of a substantially larger positive voltage from voltage supply 11 coupled between the cathode electrode 9 and conductive film 12 functioning as the anode electrode. The potential between cathode electrode 9 and anode electrode 12 is approximately 300–800 volts. Energy from the electrons attracted to the anode conductive film 12 is transferred to particles of the phosphor coating 3, resulting in luminescence. The electron charge is transferred from phosphor coating 3 to conductive film 12, completing the electrical circuit to voltage supply 11. The image created by the phosphor stripes is observed from the anode side which is opposite to the phosphor excitation, as indicated in FIG. 2.

It is to be noted and understood that true scaling information is not intended to be conveyed by the relative sizes and positioning of the elements of anode plate 1 and the elements of emitter plate 2 as depicted in FIG. 2. For example, in a typical prior art FED shown in FIG. 2 there are approximately one hundred arrays 4, of microtips and there are three color stripes $3_R$, $3_B$, $3_G$ per display pixel.

The process of producing each frame of a display using a typical trichromatic field emission display includes a) applying an accelerating potential to the red anode stripes while sequentially addressing the gate electrodes (row lines) with the corresponding red video data for that frame applied to the cathode electrodes (column lines); b) switching the accelerating potential to the green anode stripes while sequentially addressing the row lines for a second time with the corresponding green video data for that frame applied to the column lines; and c) switching the accelerating potential to the blue anode stripes while sequentially addressing the row lines for a third time with the corresponding blue video data for that frame applied to the column lines. This process is repeated for each display frame.

What is needed is an pen-based system which uses the anode plate structure of the FED for stylus detection. More ideally, what is needed is a pen-based system which occupies a minimum amount of anode plate area.

SUMMARY OF THE INVENTION

An electrographic system is comprised of a member having an exterior surface such as a display screen, the member being made of a material suitable for propagating ultrasonic energy and a plurality of piezoelectric point elements coupled to the solid medium. The piezoelectric point elements are capable of transforming electrical energy into ultrasonic energy and transforming ultrasonic energy into electrical energy. The system further comprises a stylus means which may be freely moved across the surface of the member, and which stylus also has the capability of generating ultrasonic energy. Circuitry coupled to the piezoelectric point elements applies electrical signals to the piezoelectric point elements, receives electrical signals from the piezoelectric point elements, and responds to the received signals to derive a x-coordinate and a y-coordinate representation of the stylus location.

Alternatively, according to a particular application, the electrographic system operates with a field emission device having an anode plate and an emitter plate, and a plurality of piezoelectric point elements coupled to the anode plate which may also be a display screen. The piezoelectric point elements are capable of transforming electrical energy into ultrasonic energy and transforming ultrasonic energy into electrical energy. A stylus moved across the outside surface of the anode plate generates ultrasonic energy. Circuitry coupled to the piezoelectric point elements receive the ultrasonic energy and determine the position of the stylus. The circuitry may also send a video data signal to the emitter plate representative of the position determination.

The use of the pen system, as disclosed here with a FED display, has numerous advantages. First, the pen based system of the present invention facilitates a more accurate determination of the x,y location of the pen or stylus than pen systems of the prior art. In addition, the piezoelectric based system of the present invention utilizes the anode plate of the FED and therefore eliminates the extra weight of prior art systems and the need for the extra assembly and alignment work of prior art systems. Furthermore, the use of piezoelectric point elements requires a minimal amount of access to the edges of the anode plate.

BRIEF DESCRIPTION OF THE DRAWINGS

The foregoing features of the present invention may be more fully understood from the following detailed description, read in conjunction with the accompanying drawings, wherein:

FIG. 4 is a cross-sectional view of a portion of a pen-based field emission device system according to the present invention.

DETAILED DESCRIPTION

Figure 1:
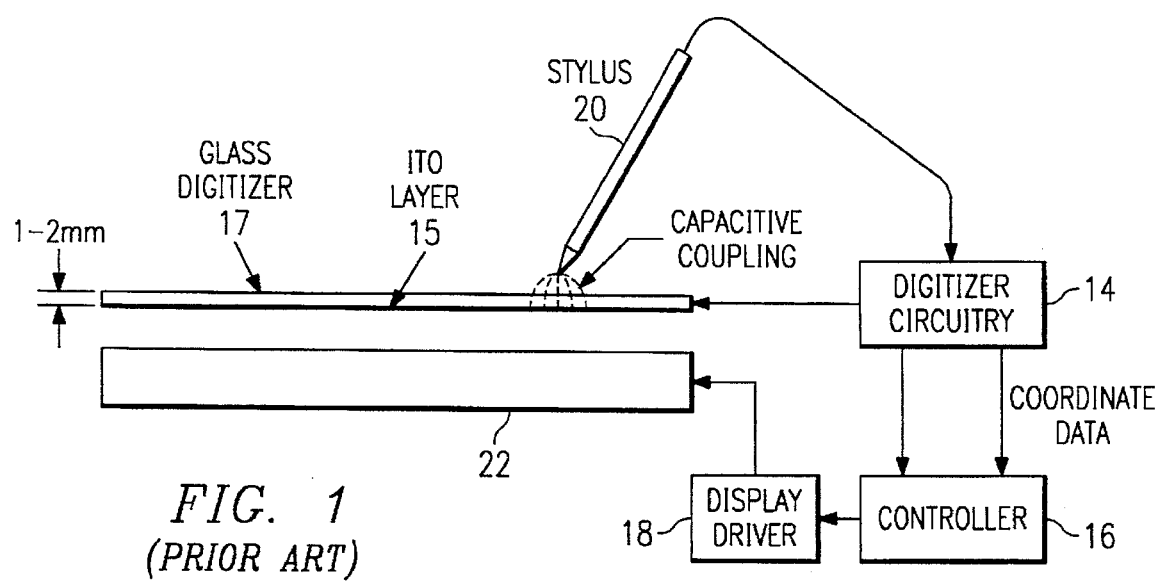
FIG. 1 is a plan view of a pen-based FED system according to the prior art.
Figure 3:
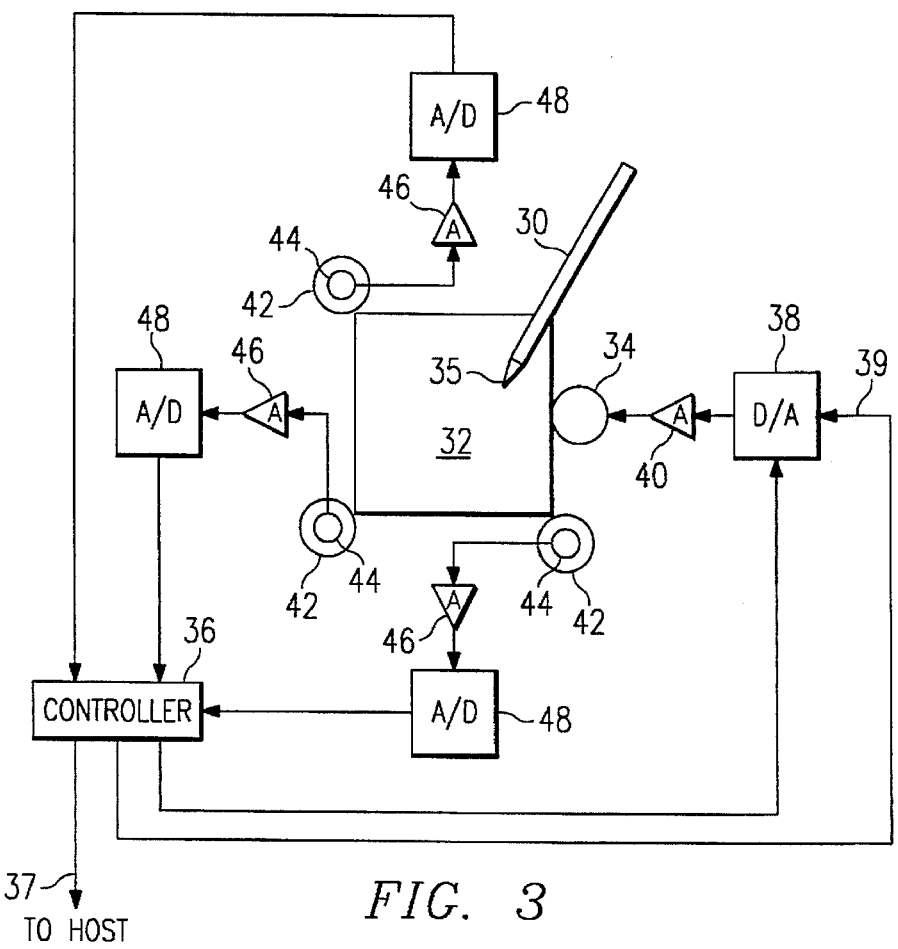
FIG. 3 shows a block diagram of a portion of a pen-based system of the present invention.

FIG. 3 shows a block diagram of a portion of a piezoelectric pen-based electrographic system of the present invention. A piezoelectric source such as piezoelectric crystal 34 generates bursts of ultrasonic waves which will be referred hereinafter also as wave packets. Typically this wave packet will have frequencies in the range of 5–10 MHz. The frequency used is dependent on the pen location resolution desired. The means of producing such wave packets are well known in the art of ultrasonic transducer design. In response to a command from a controller 36, a digital to analog converter 38 receives an digital word on line 39 and converts the voltage to an analog signal. The analog signal is amplified by an amplifier 40 and sent to the piezoelectric crystal 34. The crystal 34 is biased through an AC voltage source and therefore generates ultrasonic vibrations in response to the analog input signal. The resonant frequency of crystal 34 is determined by the stresses formed in the piezoelectric material. The piezoelectric material is illustratively Barium Strontium Titanate ($BaSrTiO_3$); however, other piezoelectric materials may be used in the present invention.

The ultrasonic wave packet created by crystal 34 is propagated throughout a member having an exterior surface which is typically a solid medium, such as a display screen or as shown in the embodiment of FIGS. 3 and 4 a FED anode plate 32. The ultrasonic wave packet is detected by a pen or stylus 30. Stylus 30 is moveable across ultrasonic wave packet is detected by a pen or stylus 30. Stylus 30 is moveable across the outside surface of anode plate 32 and selectively interacts with anode plate 32 for the purpose of deriving the current x and y location 35 of the stylus 30. The structure and operation of stylus 30, which is discussed in more detail below with respect to FIG. 5, detects the ultrasonic wave packet sent by crystal 34, and in response, stylus 30 transmits a second ultrasonic wave packet which also propagates throughout anode plate 32.

The second ultrasonic wave packet, which was sent by stylus 30, is detected by three point elements 42 of piezoelectric material which are located on any three corners of the anode plate 32. When an ultrasonic wave packet is received by any point element 42, the point element generates an AC voltage. The AC voltage generated by the point element 42 is passed onto contact pads or metal discs 44 attached to the top surface of the piezoelectric point element 42. The metal discs 44 are illustratively plated copper or other highly conductive materials.

The AC voltage at each disc 44 is then sent through amplifiers 46 where the AC signal is amplified to match the resolution range of analog to digital converters 48. The amplified AC signal is then converted to a digital signal by the analog to digital converter 48. The signal is then received by the controller 36.

The controller 36 receives the signals generated by each of the three piezoelectric point elements 42. The x,y location 35 of stylus 30 is calculated by the controller 36 according to any of the well known triangulation algorithms that calculate the stylus position 35 by comparing the difference in time between the ultrasonic wave packet from the stylus reaching each of the point elements 42. Since the controller initiated the first wave packet of ultrasonic energy from crystal 34, and because both the first ultrasonic wave packet generated by crystal 34 and the second ultrasonic wave packet generated by stylus 30 are received by the piezoelectric point elements 42, the controller monitors the input lines from the A/D converters 48 after the generation of the first wave packet or only during the window of time when the stylus 30 is transmitting the second ultrasonic wave packet. According to the described embodiment, the system alternates between the send and receive mode every 1–2 microseconds and all pen or stylus detection activity occurs during the non-active time between display frames.

Figure 2:
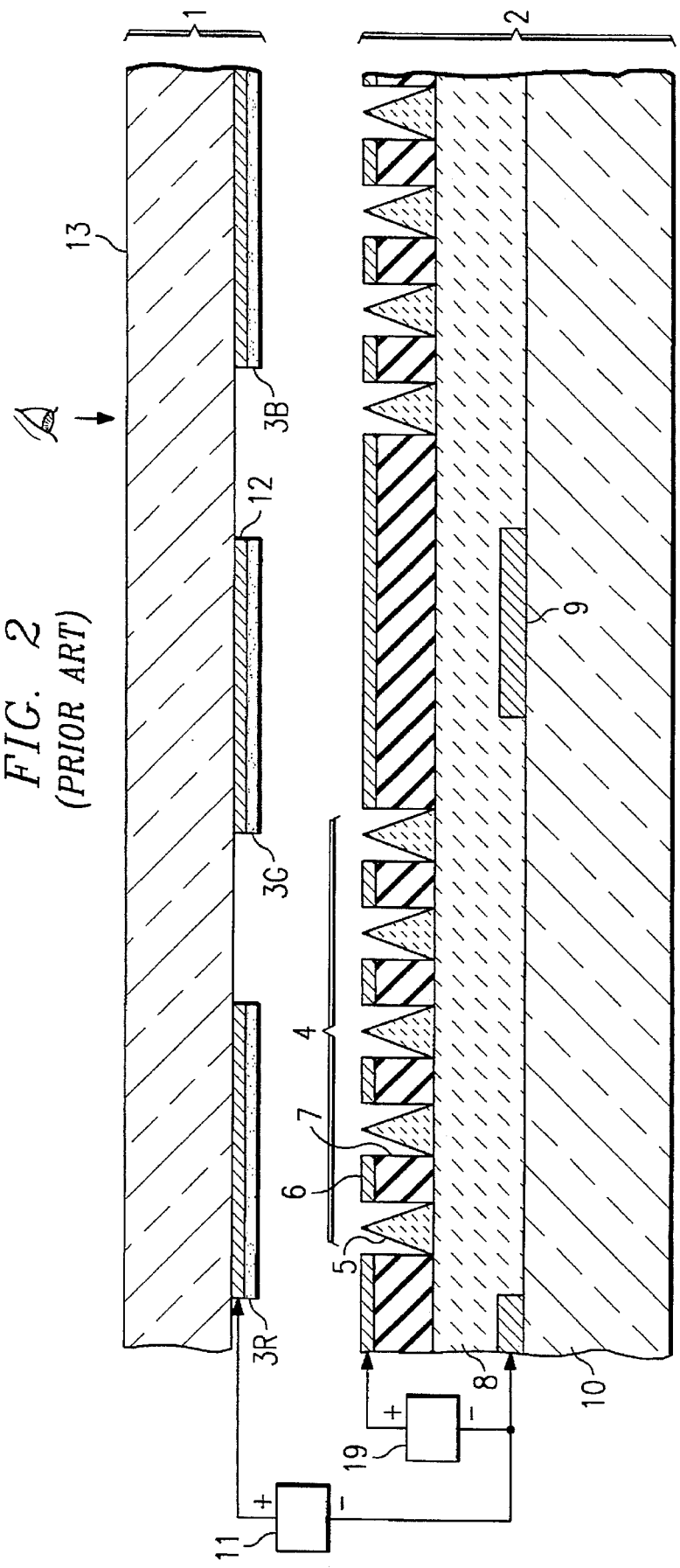
FIG. 2 is a cross-sectional view of a portion of a field emission device according to the prior art.

FIG. 4 is a cross-sectional view of a portion of a field emission device using the piezoelectric pen or stylus according to the present invention. Elements in FIG. 4 which are numbered identical to elements shown in the prior art FIG. 2 are substantially similar to the elements of FIG. 2. The piezoelectric point element 42 and the metal disc 44 is attached to a corner of the glass substrate of anode plate 32 with bonding material well known in the art. As shown in FIG. 4, the piezoelectric point element 42 is located outside the glass seal 50. would cause the glass substrate to break. The plastic film 52 utilized in the present invention allows the ultrasonic wave packets to travel freely and with minimum attenuation.

Figure 5:
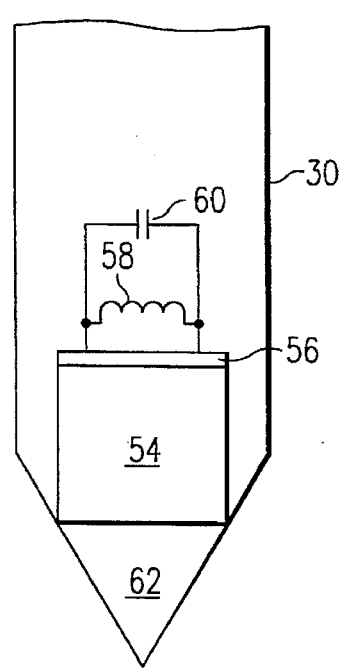
FIG. 5 is a cross-sectional view of a portion of the stylus according to the present invention.

FIG. 5 is a cross-sectional view of a portion of the stylus 30 according to the present invention. Piezoelectric material located in stylus 30, such as piezoelectric crystal 54, acts as both a receiver of the ultrasonic wave packet sent by the piezoelectric source crystal 34, and a transmitter of a second wave packet. The stylus crystal 54 has the same resonant frequency as the crystal 34. The tip 62 of stylus 30 is made of a metal, such as plated copper or aluminum, through which the ultrasonic wave packets can pass without attenuation.

An inductor 58 and a capacitor 60 are coupled through a metal strip 56 to the crystal 54. During the operation of the apparatus, the ultrasonic wave packet transmitted by source crystal 34 is detected by stylus crystal 54. In response, the stylus crystal 54 generates a voltage pulse which is passed through the metal strip 56 to the inductor 58 and the capacitor 60 (in the described embodiment the voltage pulse is approximately 15 volts). Together, the inductor 58 and capacitor 60 create a resonant circuit which receives, stores and releases back to the crystal 54 the voltage initially created by the crystal 54.

Upon receiving the voltage from the resonant circuit, the stylus crystal 54 generates a second ultrasonic wave packet which is sent throughout the anode plate 32. The ultrasonic wave packet is then received by the three piezoelectric point elements 42. As described above, the controller 36 now calculates the x,y location of the stylus. In applications where the FED displays stylus activity or movement, the controller 36 sends the stylus position to a host processor (not shown) for further processing as described below.

Figure 6:
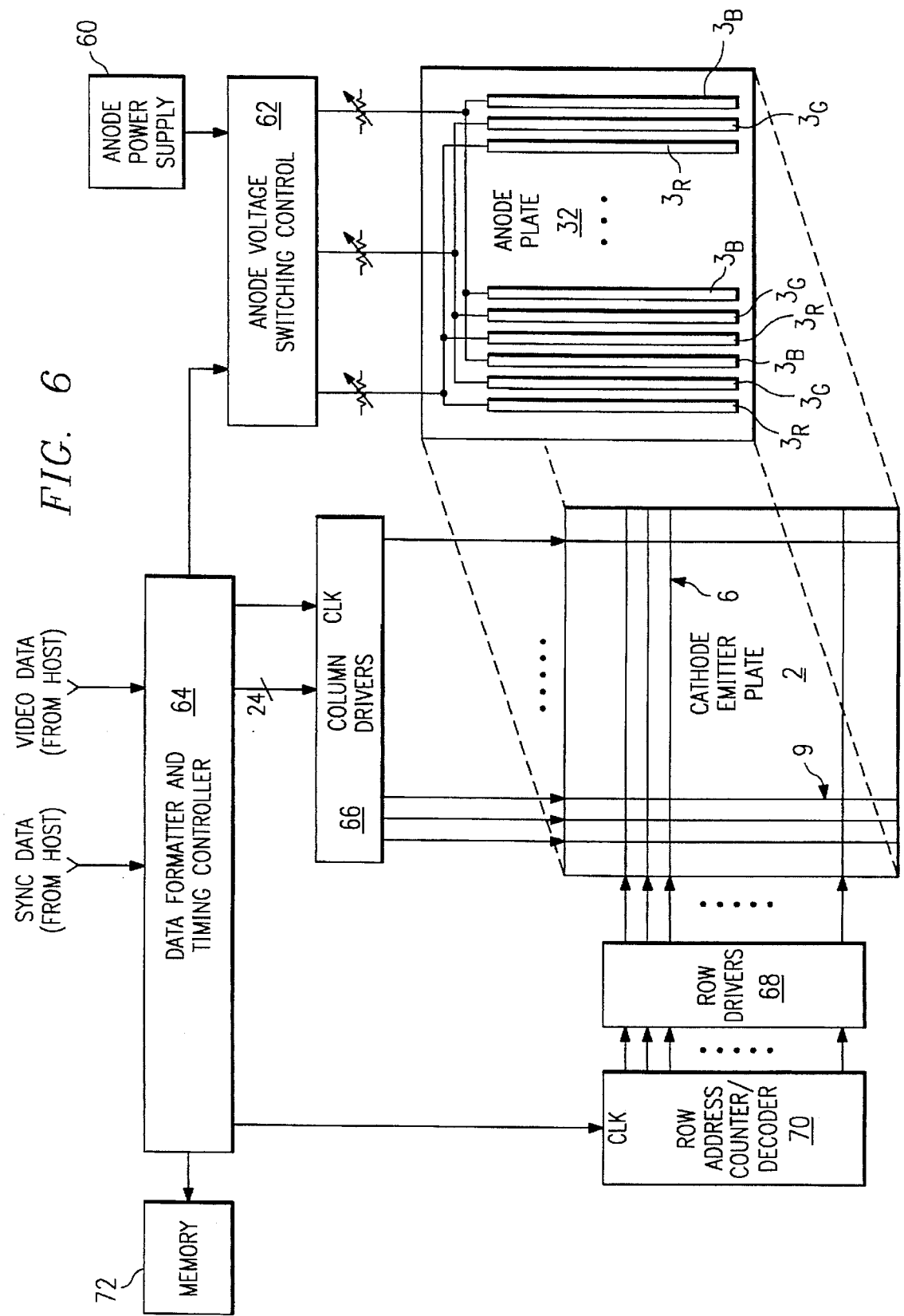
FIG. 6 is a block diagram of a portion of a field emission display electronics system according to the present invention.

FIG. 6 is a block diagram of a portion of a field emission display electronics system as disclosed in U.S. patent application Ser. No. 08/332,182, "Field Emission Device Automatic Anode Voltage Adjuster," filed 31 Oct. 1994 (Texas Instruments, Inc. Docket No. TI-19620), incorporated herein by reference. Once the controller 36 receives the detection information from the point elements 42 and calculates the pen position 35 of the stylus 30, the controller then sends the stylus position information to the FED host processor. The host processor may now use the x-y position information to implement such functions as performing the selected command or continuing the line being drawn. The field emission device system displays the desired information using the system operation described more fully below.

As indicated in FIG. 6, anode plate 32 is physically located over emitter plate 2; however, anode plate 32 and emitter plate 2 are separated in the drawing in order to better show the elements comprising plates 32 and 2 of the FED display. Elements which are part of the system but which are unimportant to the understanding of the field emission display are not shown.

Anode power supply 60 provides a high voltage source to an anode switching control 62, typically between 300 and 800 volts. The anode voltage switching control 62, responsive to commands issued from data formatting and timing controller 64, provides voltages simultaneously (if the image is in monochrome) or sequentially (if the image is in color) to the three anode stripes $3_R$, $3_G$, and $3_B$, each of the anode stripe voltages being set to a level in accordance with the brightness characteristics of the corresponding luminescent material.

The cathode electrodes 9 (column lines) of matrix-addressable cathode emitter plate 2 are individually coupled to column drivers 66. The column drivers 66 receive video data from a host device, which has been formatted by the data formatter and timing controller 64 into separate red, green, and blue display fields from an original mixed signal. In this example, the data formatter and timing controller 64 may process the video data according to the VGA standard, and may typically output data to the column drivers 66 for output on 640 parallel lines, to thereby provide one color component of a single row of the display. The data from the data formatter and timing controller 64 is latched into the column drivers 66 upon each occurrence of a clock signal received at the CLK input terminal.

The gate electrodes 6 (row lines) of matrix-addressable cathode plate 2 are individually coupled to row drivers 68. The row drivers 68 receive enable signals from row address counter/decoder 70. The device 70 includes a counter which is responsive to each occurrence of a clock signal received at a CLK input terminal, and a decoder which applies an enabling signal sequentially to each of the row drivers 70. In this example, the counter of the device 70 may count to 480, the decoder portion of the device 70 applying enabling signals sequentially to each of the row drivers 68, to thereby address each of the 480 output lines.

The data formatter and timing controller 64 also receives a synchronization input signal from the host. The sync input contains the clock, horizontal sync, and vertical sync information.

The data formatter and timing controller 64 is coupled to frame memory 72. The memory 72 holds the luminance information corresponding to two red pixels, two green pixels and two blue pixels. For illustration purposes, memory 72 comprises 307,200 words of 12-bit length, which is the capacity necessary to store two full frames of six bits of luminance information for each pixel of a 640-column by 480-row display system.

In accordance with a field sequential mode of operation, an entire frame of red luminance information is first clocked out of the memory 72. After an entire frame of red luminance information has been transferred from the memory 72 a similar process is repeated for an entire frame of green luminance information, and thereafter for an entire frame of blue luminance information. This entire process is repeated continuously while an image is displayed by the FED.

The pen or stylus location system of the present invention may be used in a wide variety of situations. The pen system may be used for screen control applications such as selecting an icon or entering a command. In addition, the pen system may be used for graphical data capture such as drawing pictures. Furthermore, the system may be used for recording hand written notes, recording a signature, and for handwriting recognition.

Figure 7:
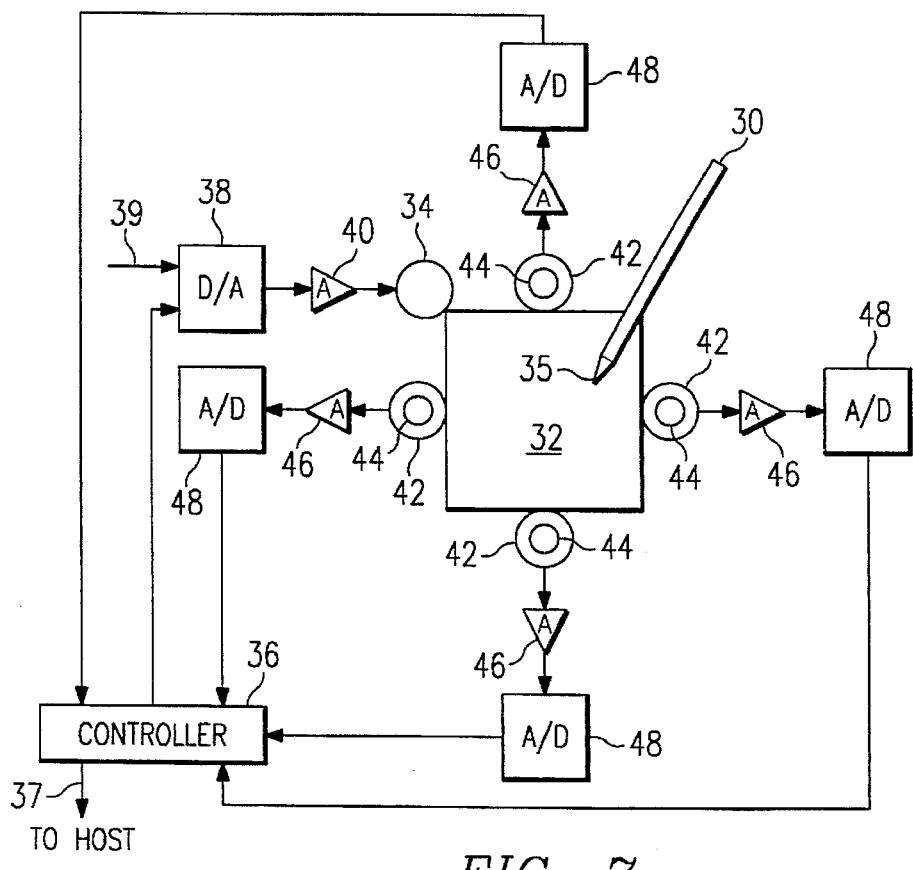
FIG. 7 shows a block diagram of a portion of a pen-based system of an alternative embodiment of the present invention.

FIG. 7 shows a block diagram of a portion of a pen-based system of an alternative embodiment of the present invention. Elements in FIG. 7 which are numbered identical to elements shown in FIG. 3 are substantially similar to the elements of FIG. 3. In the alternative embodiment of the present invention four piezoelectric point elements are attached to the anode plate 32 at each of the four corners of anode plate 32, or at the midpoint of each side of anode plate 32 as shown. The x,y location 35 of stylus 30 is now calculated by the controller 36 by comparing the difference in time between the second ultrasonic wave packet reaching opposing point elements 42.

Several other variations of the above would be understood by one skilled in the art and are considered to be within the scope of the present invention. For example, while the disclosure describes the data formatter and timing controller as processing the video data according to the VGA standard; other video resolutions and array sizes can be accommodated. In addition, the functions of the controller 36 and the data formatter and timing controller 64 could be performed by a single microprocessor. Furthermore, while the disclosure describes a three-color display device, it is intended to include any color display generation scheme employing field emission technology.

Another variation within the scope of the present invention is to use one of the piezoelectric point elements 42 to provide the first ultrasonic wave packet to anode plate 32 instead of using the piezoelectric crystal 34 as the source for that ultrasonic wave packet. This alternative would reduce the cost of the pen based system of the present invention by eliminating the expense associated with having a piezoelectric crystal source 34 separate from the piezoelectric point elements 42.

Figure 8:
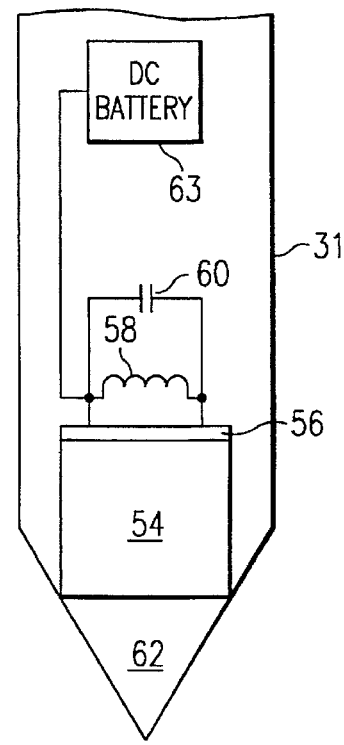
FIG. 8 is a cross-sectional view of a portion of the stylus according to an alternative embodiment of the present invention.

In this embodiment, shown in FIG. 8, the stylus 31 is substantially similar to the stylus 30 shown in FIG. 5 and described above; however, stylus 31 uses a battery power source 63 to create the ultrasonic wave packet which is transmitted through the anode plate 32 to the four piezoelectric stripes 42. During operation the piezoelectric material located in stylus 31, such as piezoelectric crystal 54, receives a voltage pulse of approximately 15 volts which passes through the resonant circuit comprised of inductor 58 and capacitor 60 to metal strip 56.

Upon receiving the voltage from the resonant circuit, the stylus crystal 54 generates the ultrasonic wave packet which is sent through the anode plate 32. The ultrasonic wave packet is then received by the four piezoelectric stripes 42 and the controller 36 then calculates the x,y location of the stylus. Because the ultrasonic wave packet originates in the stylus 31 in this embodiment, the transmitting crystal 34, shown in FIG. 3, is not needed and the piezoelectric stripes 42 are not used transmit an ultrasonic wave packet. In this embodiment the stylus 31 would continuously send ultrasonic wave packets, however, the piezoelectric stripes 42 would only detect ultrasonic wave packets during the non-active time between display frames.

The stylus 31 may receive its voltage pulse by alternative means. For instance, the voltage pulse may be sent by the controller 36 to stylus 31 through a cable which connects between the controller 36 and the stylus 31.

Yet another variation within the scope of the present invention is to have the piezoelectric structure attached to a solid medium such as a glass plate which is separate, but proximate to, the anode plate 1 of the field emission device. This alternative would allow the pen based system of the present invention to be manufactured separately. Furthermore, this alternative would allow the utilization of the pen based system of the present invention with other display systems such as the liquid crystal display (LCD) or the cathode ray tube (CRT).

The use of the stylus or pen location system, as disclosed here, has numerous advantages. First, the system of the present invention facilitates a more accurate determination of the x,y location of the stylus then systems of the prior art. In addition, when used with an FED, the system of the present invention utilizes the anode plate of the FED and therefore eliminates the extra weight of prior art systems and the need for the extra assembly and alignment work of prior art systems. Furthermore, the use of piezoelectric point elements requires a minimal amount of access to the edges of the anode plate.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims which follow.

What is claimed is:

1. A system comprising:

a member having an exterior surface, said member propagating ultrasonic energy;

a plurality of piezoelectric point elements coupled to said member; one of said plurality of piezoelectric point elements transforming electrical energy into a first ultrasonic energy and coupling said first ultrasonic energy into said member, all but one of said plurality of piezoelectric point elements transforming received ultrasonic energy into electrical energy;

a stylus means moveable across said exterior surface of said member, said stylus means generating second ultrasonic energy and coupling said generated second ultrasonic energy into said member, said second ultrasonic energy provided by said stylus means and generated by a piezoelectric crystal located inside said stylus means; and circuitry coupled to said plurality of piezoelectric point elements for applying electrical signals to said one of said plurality of piezoelectric point elements to generate said first ultrasonic energy, and receiving electrical signals from all but one of said plurality of piezoelectric point elements in response to said second ultrasonic energy propagating through said member, said circuitry further responsive to said received signals for deriving a x-coordinate and a y-coordinate of said stylus means;

wherein said stylus means further includes inductive and capacitive circuitry coupled to said piezoelectric crystal, and further wherein said stylus means receives said first ultrasonic energy propagated through said member, transforms said first ultrasonic energy into electrical energy and stores said electrical energy in said inductive and capacitive circuitry, said piezoelectric crystal then transforming said stored energy to said second ultrasonic energy and then outputting said second ultrasonic energy to said member.

2. A system comprising:

a field emission device having an anode plate with an exterior surface and an emitter plate;

a plurality of piezoelectric point elements coupled to said anode plate; one of said plurality of piezoelectric point elements transforming electrical energy into a first ultrasonic energy and coupling said first ultrasonic energy into said anode plate, all but one of said plurality of piezoelectric point elements transforming received ultrasonic energy into electrical energy;

a stylus moveable across said exterior surface of said anode plate, said stylus generating second ultrasonic energy and coupling said generated second ultrasonic energy into said anode plate; and circuitry coupled to said plurality of piezoelectric point elements for applying electrical signals to said one of said plurality of piezoelectric point elements to generate said first ultrasonic energy, and receiving electrical signals from all but one of said plurality of piezoelectric point elements in response to said second ultrasonic energy propagating through said anode plate, said circuitry further responsive to said received signals for deriving a x-coordinate and a y-coordinate of said stylus;

wherein said stylus receives said first ultrasonic energy and converts said first ultrasonic energy into a voltage which is stored, then converts said stored voltage into said second ultrasonic energy, and then transmits said second ultrasonic energy to said anode plate.

3. The system in accordance with claim 2 wherein said second ultrasonic energy provided by said stylus is generated by a piezoelectric crystal.

4. The system in accordance with claim 3 wherein said stylus further includes inductive and capacitive circuitry coupled to said crystal, and further wherein said stylus receives said first ultrasonic energy propagated through said anode plate, transforms said first ultrasonic energy into electrical energy and stores said electrical energy in said inductive and capacitive circuitry, said piezoelectric crystal then transforming said stored energy to said second ultrasonic energy and then outputting said second ultrasonic energy to said anode plate.

5. The system in accordance with claim 2 wherein said one of said plurality of piezoelectric point elements is coupled to an edge of said anode plate, and a second, third and fourth of said plurality of piezoelectric point elements is coupled to a first, second, and third corner of said anode plate.

6. The system in accordance with claim 5 wherein a fifth of said plurality of piezoelectric point elements is coupled to a fourth corner of said anode plate.

7. The system in accordance with claim 6 wherein said anode plate propagates a first ultrasonic energy from said one of said plurality of piezoelectric point elements to said stylus, and propagates a second ultrasonic energy from said stylus to said second, third, and fourth of said plurality of piezoelectric point elements.

8. The system in accordance with claim 7 wherein said first and second ultrasonic wave packet are the same frequency.

9. The system in accordance with claim 7 wherein said circuitry determines the position of said stylus based on the time difference between the reception of said second ultrasonic energy wave packet by said second, third, and fourth piezoelectric point elements.

10. The system in accordance with claim 7 wherein said anode plate propagates said first and second ultrasonic wave packets between said piezoelectric point elements and said stylus during the non-active time between each display frame.

11. The system in accordance with claim 7 wherein said fifth piezoelectric point element receives said second ultrasonic wave packet propagated by said anode plate, and said circuitry determines the position of said stylus based on the time difference between the reception of said second ultrasonic energy wave packet by said second, third, fourth, and fifth piezoelectric point elements.

12. The system in accordance with claim 2 wherein said one of said plurality of piezoelectric elements is coupled to a corner of said anode plate, and a second, third, and fourth of said plurality of piezoelectric point elements is coupled to a midpoint of a first, second, and third side of said anode plate.

13. The system in accordance with claim 12 wherein a fifth of said plurality of piezoelectric point elements is coupled to a fourth side of said anode plate.

14. The system in accordance with claim 13 wherein said anode plate propagates a first ultrasonic energy from said one of said plurality of piezoelectric point element to said stylus, and propagates a second ultrasonic energy from said stylus to said second, third, fourth, and fifth of said plurality of piezoelectric point elements.

15. The system in accordance with claim 12 wherein said first and second ultrasonic wave packet are the same frequency.

16. The system in accordance with claim 14 wherein said circuitry determines the position of said stylus based on the time difference between the reception of said second ultrasonic energy wave packet by said second, third, fourth, and fifth piezoelectric point elements.

17. The system in accordance with claim 14 wherein said anode plate propagates said first and second ultrasonic wave packets between said piezoelectric point elements and said stylus during the non-active time between each display frame.

18. The system in accordance with claim 2 wherein said circuitry sends a video data signal to said field emission device in response to said derivation.

19. The system in accordance with claim 18 wherein said field emission device displays an image in response to said video data signal.

* * * * *